(12) United States Patent
Lonnroth

(10) Patent No.: US 12,304,171 B2
(45) Date of Patent: May 20, 2025

(54) THREE-DIMENSIONAL, SEAMLESS AND COLORED COVER FOR AN ELECTRONIC DEVICE

(71) Applicant: Huawei Technologies Co., Ltd., Shenzhen (CN)

(72) Inventor: Nadja Lonnroth, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 356 days.

(21) Appl. No.: 17/780,450

(22) PCT Filed: Dec. 3, 2019

(86) PCT No.: PCT/EP2019/083398
§ 371 (c)(1),
(2) Date: May 26, 2022

(87) PCT Pub. No.: WO2021/110242
PCT Pub. Date: Jun. 10, 2021

(65) Prior Publication Data
US 2023/0009967 A1    Jan. 12, 2023

(51) Int. Cl.
| | | |
|---|---|---|
| B32B 17/06 | (2006.01) |
| B32B 37/24 | (2006.01) |
| C03B 23/203 | (2006.01) |
| C03C 3/083 | (2006.01) |

(Continued)

(52) U.S. Cl.
CPC .............. *B32B 17/06* (2013.01); *B32B 37/24* (2013.01); *C03B 23/203* (2013.01); *C03C 3/083* (2013.01);

(Continued)

(58) Field of Classification Search
CPC ... B32B 17/06; B32B 37/24; B32B 2037/246; B32B 2255/20; B32B 2307/4023; B32B 2307/412; B32B 2457/00; B32B 3/266; B32B 2457/20; C03B 23/203; C03C 3/083; C03C 4/02; C03C 17/245;

(Continued)

(56) References Cited

U.S. PATENT DOCUMENTS

2003/0039844 A1* 2/2003 Sugiyama ........... C03C 17/3417
204/192.27
2014/0139978 A1* 5/2014 Kwong ................ C30B 29/20
361/679.01

(Continued)

FOREIGN PATENT DOCUMENTS

CN        109473042 A    3/2019

*Primary Examiner* — Kenneth T Lam
(74) *Attorney, Agent, or Firm* — Slater Matsil, LLP

(57) ABSTRACT

A seamless three-dimensional cover (1) for an electronic device (2), the seamless three-dimensional cover (1) comprising of at least one glass base layer (3) and at least one glass rim layer (4). At least one layer of color inducing film (5) is arranged between at least one of the base layer (3) and the rim layer (4), or between two adjacent rim layers (4). The base layer (3), the rim layer(s) (4), and the layer of color inducing film (5) are fused together to form the seamless three-dimensional cover (1). This facilitates a strong and durable three-dimensional cover, which cover is translucent as well as at least partially colored. Furthermore, the cover does not affect the function of components such as millimeter-wave antennas.

19 Claims, 1 Drawing Sheet

(51) Int. Cl.
  *C03C 4/02* (2006.01)
  *C03C 17/245* (2006.01)
  *H04B 1/3888* (2015.01)
(52) U.S. Cl.
  CPC .............. *C03C 4/02* (2013.01); *C03C 17/245* (2013.01); *H04B 1/3888* (2013.01); *B32B 2037/246* (2013.01); *B32B 2255/20* (2013.01); *B32B 2307/4023* (2013.01); *B32B 2307/412* (2013.01); *B32B 2457/00* (2013.01); *C03C 2218/151* (2013.01); *C03C 2218/152* (2013.01)
(58) Field of Classification Search
  CPC ........ C03C 2218/151; C03C 2218/152; C03C 27/06; C03C 17/23; C03C 2217/72; C03C 2218/154; H04B 1/3888; G06F 1/1626; H04M 1/0283; H04M 1/0202
  See application file for complete search history.

(56) References Cited

U.S. PATENT DOCUMENTS

| 2014/0202916 | A1* | 7/2014 | Kanda | A45C 11/00 |
|---|---|---|---|---|
| | | | | 206/524.3 |
| 2015/0190986 | A1* | 7/2015 | Bibl | B32B 7/04 |
| | | | | 428/138 |
| 2016/0075595 | A1* | 3/2016 | Jang | C04B 35/10 |
| | | | | 423/625 |
| 2016/0279904 | A1* | 9/2016 | Sienerth | B32B 17/10119 |
| 2018/0117880 | A1* | 5/2018 | Liu | B32B 38/145 |
| 2018/0155236 | A1* | 6/2018 | DeLamielleure | |
| | | | | B32B 17/10036 |
| 2020/0045155 | A1* | 2/2020 | Ha | G02B 5/003 |
| 2020/0369560 | A1* | 11/2020 | Takeda | B32B 7/025 |
| 2020/0385307 | A1* | 12/2020 | Li | C03C 15/00 |

\* cited by examiner

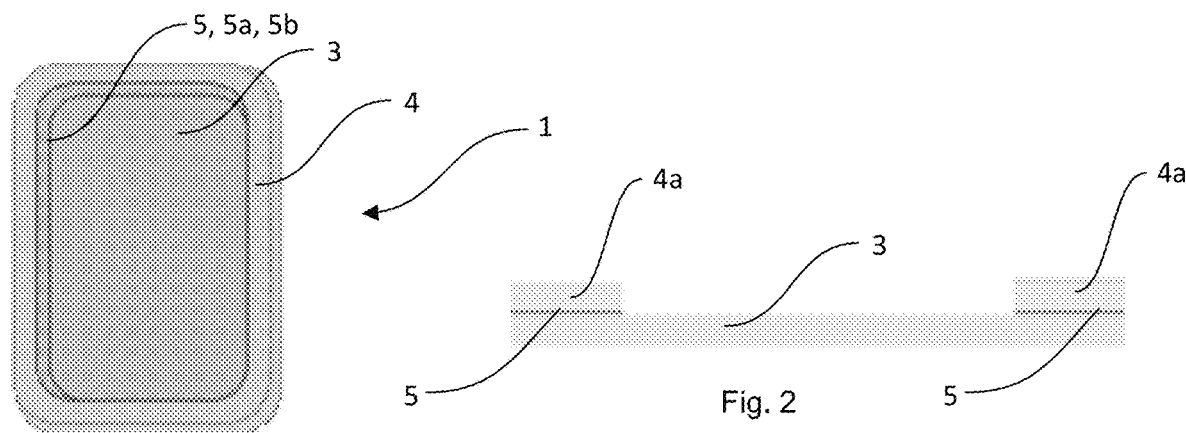
Fig. 1
Fig. 2
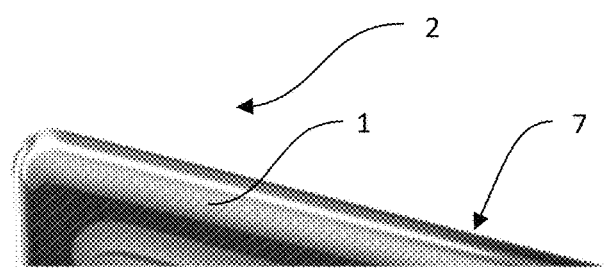
Fig. 3
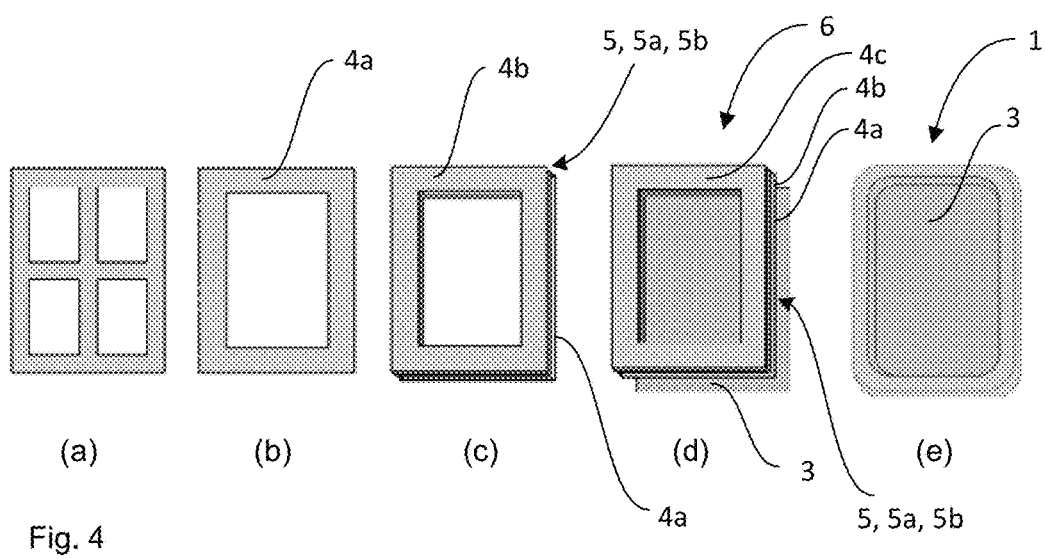
Fig. 4

THREE-DIMENSIONAL, SEAMLESS AND COLORED COVER FOR AN ELECTRONIC DEVICE

CROSS-REFERENCE TO RELATED APPLICATIONS

This application is a National Stage of International Application No. PCT/EP2019/083398, filed on Dec. 3, 2019.

TECHNICAL FIELD

The disclosure relates to a seamless three-dimensional cover for an electronic device, the seamless three-dimensional cover comprising of at least one glass base layer and at least one glass rim layer.

BACKGROUND

The design of an electronic device is a key factor for its success in the marketplace. One possible design choice is the choice of material used for the external cover of the electronic device, which, over the years, has changed from a plastic housing to more high-end housings comprising metal and/or glass. A further design choice is the choice of color of the cover, a choice which is relatively easily effectuated as long as the cover is made of plastic or metal.

The durability of a glass cover is a concern since glass is a brittle material having natural weak points at edges or transitions, and which is subject to residual stress created during the glass forming process. Hence, glass covers are advantageously subject to chemical strengthening, a process which is not available for colored glass.

Prior art solutions add color to glass covers by painting or printing on top of transparent glass sections. Painting is an ineffective and time-consuming solution, which also leaves the glass looking dull and heavy since the glass section no longer is transparent or even translucent. Printing can only be applied onto flat surfaces which prevents all parts of the three-dimensional cover from having a colored appearance.

SUMMARY

It is an object to provide an improved seamless three-dimensional cover. The foregoing and other objects are achieved by the features of the independent claim. Further implementation forms are apparent from the dependent claims, the description, and the figures.

According to a first aspect, there is provided a seamless three-dimensional cover for an electronic device, the seamless three-dimensional cover comprising of at least one glass base layer and at least one glass rim layer, at least one layer of color inducing film being arranged between at least one of the base layer and the rim layer, or between two adjacent rim layers, the base layer, the rim layer(s), and the layer of color inducing film being fused together to form the seamless three-dimensional cover.

This solution facilitates a strong and durable three-dimensional cover, which cover is transparent as well as at least partially colored. Furthermore, the cover does not affect the function of components such as millimeter-wave antennas, as it is made from dielectric material. The glass provides the cover with a light and exclusive feel, as opposed to other dielectric materials such as plastic.

In a possible implementation form of the first aspect, the rim layer(s) extend(s) along a peripheral edge of the base layer in a direction perpendicular to a main surface of the base layer, the rim layer(s) allowing the three-dimensional cover to give the impression of comprising of colored glass, relieving the designer/manufacturer from having to consider the restrictions inherent to colored glass, such as it e.g. not being chemically strengthenable.

In a further possible implementation form of the first aspect, at least one of the base layer and the rim layer(s) comprise transparent and/or colorless glass, facilitating any kind of desired colored or non-colored appearance.

In a further possible implementation form of the first aspect, the base layer comprises a plurality of sub-layers, a layer of color inducing film being arranged between the sub-layers, allowing also entire cover to be provided with color in a translucent manner.

In a further possible implementation form of the first aspect, at least one of the base layer and the rim layer(s) comprises chemically strengthenable glass, facilitating a reliable and scratch and impact resistant cover.

In a further possible implementation form of the first aspect, the color inducing film comprises an inorganic thin film material, allowing the cover to appear colored without any visible seams.

In a further possible implementation form of the first aspect, the thin film material has a thickness of ≤1 µm, preferably 10-50 nm.

In a further possible implementation form of the first aspect, the color inducing film comprises a metal oxide or metal oxide based material, facilitating the bonding between the color inducing film and adjacent glass layers.

According to a second aspect, there is provided a method of manufacturing a seamless three-dimensional cover for an electronic device, the method comprising the steps of providing a first flat sheet of transparent glass, providing a first layer of color inducing film on the first flat sheet of transparent glass, providing a second flat sheet of transparent glass on top of the first layer of color inducing film, fusing the layers to form a seamless three-dimensional material, machining the seamless three-dimensional material to form the seamless three-dimensional cover.

Such a method facilitates the manufacture of a strong and durable three-dimensional cover, which cover may be chemically strengthened and which is transparent or translucent as well as at least partially colored in any color desired.

In a possible implementation form of the second aspect the fusing comprises using a layer of metal oxide or metal oxide based material, facilitating the bonding between the color inducing film and adjacent glass layers.

In a further possible implementation form of the second aspect, the first layer of color inducing film and the second flat sheet of transparent glass are arranged such that they extend along a peripheral edge of the first flat sheet of transparent glass, providing a three-dimensional cover giving the impression of comprising completely of colored glass.

In a further possible implementation form of the second aspect, the method comprises the additional step of providing at least a third flat sheet of transparent glass on top of the first flat sheet of transparent glass or the second flat sheet of transparent glass.

In a further possible implementation form of the second aspect, the method comprises the additional step of providing at least a second layer of color inducing film between the third flat sheet of transparent glass and the first flat sheet of transparent glass or the second flat sheet of transparent glass, facilitating e.g. the use of different colors within one and the same cover.

According to a third aspect, there is provided an electronic device comprising a display and a seamless three-dimensional cover according to the above, the display and the seamless three-dimensional cover forming the outer surface of the electronic device, or the display being covered by the seamless three-dimensional cover.

These and other aspects will be apparent from the embodiments described below.

BRIEF DESCRIPTION OF THE DRAWINGS

In the following detailed portion of the present disclosure, the aspects, embodiments and implementations will be explained in more detail with reference to the example embodiments shown in the drawings, in which:

FIG. 1 shows a schematic illustration of a seamless three-dimensional cover in accordance with an embodiment of the present invention;

FIG. 2 shows a schematic cross-sectional side view of a seamless three-dimensional cover in accordance with an embodiment of the present invention;

FIG. 3 shows a partial perspective view of an electronic device comprising a seamless three-dimensional cover in accordance with an embodiment of the present invention;

FIG. 4 shows a schematic illustration of a method of manufacturing a seamless three-dimensional cover in accordance with an embodiment of the present invention.

DETAILED DESCRIPTION OF ILLUSTRATIVE EMBODIMENTS

FIG. 3 shows an electronic device 2, such as a smartphone or a tablet, comprising a display 7 and a seamless three-dimensional cover 1, described in more detail below. The display 7 and the seamless three-dimensional cover 1 may together form the outer surface of the electronic device 2, such that e.g. the display 7 covers one of the outer surfaces of the electronic device 2 and the three-dimensional cover 1 covers the remaining outer surfaces of the electronic device 2. Furthermore, the seamless three-dimensional cover 1 may be arranged such that it covers the display 7.

FIGS. 1 and 2 show embodiments of the seamless three-dimensional cover 1. The three-dimensional cover 1 comprises of at least one glass base layer 3 and at least one glass rim layer 4. The rim layer(s) 4 may extend along a peripheral edge of the base layer 3 in a direction perpendicular to a main surface of the base layer 3, such that the rim layer(s) 4 facilitate the three-dimensional shape of the cover 1, providing e.g. a 90° turn around the edge of the cover 1 in relation to the base layer.

The glass base layer 3 may correspond to a back cover of the electronic device 2. The glass rim layer 4 may correspond to the side frame sections of the electronic device 2, i.e. the sections extending between back cover and a flat display.

The three-dimensional cover 1 further comprises at least one layer of color inducing film 5 arranged between the base layer 3 and the rim layer 4, as shown in FIG. 2, and/or between two adjacent rim layers 4 (not shown).

The base layer 3, the rim layers 4, and the layer of color inducing film 5 are fused together to form the seamless three-dimensional cover 1, i.e. there will be no visible seams between the different layers. Due to light reflecting internally in the cover, the color inducing film 5 will not be visible as a separate layer or seam, but provide the illusion of a fully colored cover.

By glass is intended materials such as pure glass as well as glass ceramics, or any other transparent materials suitable for fusing. At least one of the base layer 3 and the rim layers 4 may comprise transparent and/or colorless glass. Additionally, the base layer 3 may comprise non-transparent glass. Furthermore, at least one of the base layer 3 and the rim layers 4 may furthermore comprise chemically strengthenable glass.

The color inducing film 5 may comprise an inorganic thin film material. In one embodiment, the thin film material has a thickness of ≤1 μm, preferably 10-50 nm. The color inducing film 5 may comprise a thin layer of metal oxide or glassy material with high level of the wanted metal oxide. The material of the color inducing film 5 is chosen such that it bonds well with the glass during the deposition process as well as with the next glass layer during the fusing process. $Co_3O_4$ oxide and or same oxide incorporated in an example glass such as 60 $SiO_2$-25 $Co_3O_4$-10 $Na_2O$-5 $Al_2O$ are two possible material, given merely as examples. Iron based oxides, neodium, and copper oxides are further colorant material examples. The color of the color inducing film 5 will be defined by the oxidation state that the colorant ion will be in after the fusing process. As it is a high temperature process, the oxidation state will generally be the same state as the ion would be in if it was in the glass structure, there is so much oxygen potential in the glass surrounding the thin film that it will determine the oxidation state of the inorganic thin film material.

The three-dimensional cover 1 may comprise only one rim layer 4, as shown in FIG. 2, or several rim layers 4a, 4b, 4c as shown in FIG. 4. The number of rim layers depends on how high cover edges the desired design requires, and on the thickness of the glass used. Furthermore, the base layer 3 may comprise of a plurality of sub-layers, a layer of color inducing film 5 being arranged between the sub-layers. Hence, the three-dimensional cover 1 may comprise a plurality of color inducing film 5, arranged between different layers of the three-dimensional cover 1.

The present invention further relates to a method of manufacturing the above described seamless three-dimensional cover 1. The method comprises the steps described below, which steps are indicated in FIG. 4.

The first step, shown in FIG. 4a, comprises providing a first flat sheet of transparent glass. The first flat sheet, as well as any other flat sheets, may be cut from a raw sheet of glass, and may constitute the base layer 3 or a rim layer 4a of the three-dimensional cover 1.

The second step, shown in FIG. 4b, comprises providing a first layer of color inducing film 5a on the first flat sheet 3, 4a of transparent glass. The first layer of color inducing film 5a may be provided by means of a thin film coating process such as physical vapor deposition (PVD) or chemical vapor deposition (CVD).

The third step, shown in FIG. 4c, comprises providing a second flat sheet 4b of transparent glass on top of the first layer of color inducing film 5, such that the color inducing film 5 is enclosed by two layers of transparent glass. The first layer of color inducing film 5a and the second flat sheet 4b of transparent glass may be arranged such that they extend along a peripheral edge of the first flat sheet 3, 4a of transparent glass.

The fourth step comprises fusing the layers 3, 4a, 4b, 5a to form a seamless three-dimensional material 6, indicated in FIG. 4d. The glass layers attach to each other as the temperature is raised close to the softening point of the glass, the invisible seams between the layers being very strong which prevents the cover 1 from breaking along the fusion lines. The color inducing film 5 will not affect the strength of the fused seam(s).

The fifth step comprises machining the seamless three-dimensional material 6 to form the seamless three-dimensional cover 1, as shown in FIG. 4e. The machining may comprise is CNC machining to the wanted shape and subsequent polishing.

The method may comprise an additional intermediate step of providing at least a third flat sheet 4c of transparent glass on top of the first flat sheet 3, 4a of transparent glass or the second flat sheet 4b of transparent glass, as is shown in FIG. 4d.

The method may also comprise an additional intermediate step of providing at least a second layer of color inducing film 5b between the third flat sheet 4c of transparent glass and the first flat sheet 3, 4a of transparent glass or the second flat sheet 4b of transparent glass.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

The reference signs used in the claims shall not be construed as limiting the scope. Unless otherwise indicated, the drawings are intended to be read (e.g., cross-hatching, arrangement of parts, proportion, degree, etc.) together with the specification, and are to be considered a portion of the entire written description of this disclosure. As used in the description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

The invention claimed is:

1. A method of manufacturing a seamless three-dimensional cover for an electronic device, the method comprising steps of:
   providing a first flat sheet of transparent glass;
   depositing a first layer of color inducing film on the first flat sheet of transparent glass, wherein the first layer of color inducing film bonds to the first flat sheet of transparent glass during the depositing, and the first layer of color inducing film encircles a point of the first flat sheet of transparent glass and does not cover the point of the first flat sheet of transparent glass;
   providing a second flat sheet of transparent glass on top of the first layer of color inducing film, wherein the second flat sheet of transparent glass encircles the point of the first flat sheet of transparent glass and does not cover the point of the first flat sheet of transparent glass;
   fusing the first flat sheet of transparent glass, the first layer of color inducing film and the second flat sheet of transparent glass to form a seamless three-dimensional material, wherein after the fusing the first layer of color inducing film is fused to the first flat sheet of transparent glass and the second flat sheet of transparent glass; and
   machining the seamless three-dimensional material to form the seamless three-dimensional cover.

2. The method according to claim 1, further comprising:
   providing at least one third flat sheet of transparent glass on top of the first flat sheet of transparent glass or the second flat sheet of transparent glass.

3. The method according to claim 2, further comprising:
   providing at least a second layer of color inducing film between the at least one third flat sheet of transparent glass and the first flat sheet of transparent glass or the second flat sheet of transparent glass.

4. A method of manufacturing a seamless three-dimensional cover for an electronic device, the method comprising steps of:
   providing a first flat sheet of transparent glass, wherein the first flat sheet of transparent glass comprises chemically strengthened glass;
   depositing a first layer of color inducing film on the first flat sheet of transparent glass, wherein the first layer of color inducing film bonds to the first flat sheet of transparent glass during the depositing, and the first layer of color inducing film encircles a point of the first flat sheet of transparent glass and does not cover the point of the first flat sheet of transparent glass;
   providing a second flat sheet of transparent glass on top of the first layer of color inducing film, wherein the second flat sheet of transparent glass encircles the point of the first flat sheet of transparent glass and does not cover the point of the first flat sheet of transparent glass;
   fusing the first flat sheet of transparent glass, the first layer of color inducing film and the second flat sheet of transparent glass to form a seamless three-dimensional material, wherein after the fusing the first layer of color inducing film is fused to the first flat sheet of transparent glass and the second flat sheet of transparent glass; and
   machining the seamless three-dimensional material to form the seamless three-dimensional cover.

5. The method according to claim 4, wherein after the fusing of the first flat sheet of transparent glass, the first layer of color inducing film, and the second flat sheet of transparent glass, the second flat sheet of transparent glass extends along a peripheral edge of the first flat sheet of transparent glass in a direction perpendicular to a main surface of the first flat sheet of transparent glass.

6. The method according to claim 4, wherein the first layer of color inducing film comprises an inorganic thin film material.

7. The method according to claim 6, wherein the inorganic thin film material has a thickness that is between 10-50 nm.

8. The method according to claim 4, wherein the first layer of color inducing film comprises a metal oxide.

9. The method according to claim 4, wherein the first layer of color inducing film comprises a metal oxide containing material.

10. The method according to claim 4, wherein the first layer of color inducing film comprises $Co_3O_4$ or 60 $SiO_2$-25 $Co_3O_4$-10 $Na_2O$-5 $Al_2O$.

11. The method according to claim 4, wherein the first layer of color inducing film comprises a cobalt oxide material.

12. A method of manufacturing a seamless three-dimensional cover for an electronic device, the method comprising steps of:
providing a first flat sheet of transparent glass;
depositing a first layer of color inducing film on the first flat sheet of transparent glass, wherein the first layer of color inducing film bonds to the first flat sheet of transparent glass during the depositing, and the first layer of color inducing film encircles a point of the first flat sheet of transparent glass and does not cover the point of the first flat sheet of transparent glass;
providing a second flat sheet of transparent glass on top of the first layer of color inducing film, wherein the second flat sheet of transparent glass encircles the point of the first flat sheet of transparent glass and does not cover the point of the first flat sheet of transparent glass;
providing a second layer of color inducing film over the second flat sheet of transparent glass;
providing a third flat sheet of transparent glass on top of the second layer of color inducing film;
fusing the first flat sheet of transparent glass, the first layer of color inducing film, the second flat sheet of transparent glass, the second layer of color inducing film, and the third flat sheet of transparent glass, to form a seamless three-dimensional material, wherein after the fusing the first layer of color inducing film is fused to the first flat sheet of transparent glass and the second flat sheet of transparent glass; and
machining the seamless three-dimensional material to form the seamless three-dimensional cover.

13. The method according to claim 12, wherein after the fusing of the first flat sheet of transparent glass, the first layer of color inducing film, the second flat sheet of transparent glass, the second layer of color inducing film, and the third flat sheet of transparent glass, the second flat sheet of transparent glass and the third flat sheet of transparent glass extend along a peripheral edge of the first flat sheet of transparent glass in a direction perpendicular to a main surface of the first flat sheet of transparent glass.

14. The method according to claim 12, wherein the first layer of color inducing film comprises an inorganic thin film material.

15. The method according to claim 14, wherein the inorganic thin film material has a thickness that is between 10-50 nm.

16. The method according to claim 14, wherein the first layer of color inducing film comprises a metal oxide.

17. The method according to claim 14, wherein the first layer of color inducing film comprises a metal oxide containing material.

18. The method according to claim 14, wherein the first layer of color inducing film comprises $Co_3O_4$ or 60 $SiO_2$-25 $Co_3O_4$-10 $Na_2O$-5 $Al_2O$.

19. The method according to claim 14, wherein the first layer of color inducing film comprises a cobalt oxide material.

* * * * *